United States Patent
Łagutko (10) Patent No.: US 9,723,689 B2
(45) Date of Patent: Aug. 1, 2017

(54) METHOD OF LIGHTING INTENSITY AUTOMATIC ADJUSTMENT AND DEVICE WITH LIGHTING INTENSITY AUTOMATIC ADJUSTMENT

(75) Inventor: Krzysztof Włodzimierz Łagutko, Warsaw (PL)

(73) Assignee: LARS Co. Spolka z Organiczona Odpowiedzialnoscia, Piaseczno (PL)

(*) Notice: Subject to any disclaimer, the term of this patent is extended or adjusted under 35 U.S.C. 154(b) by 38 days.

(21) Appl. No.: 13/582,190

(22) PCT Filed: Mar. 3, 2011

(86) PCT No.: PCT/PL2011/000026
§ 371 (c)(1),
(2), (4) Date: Aug. 31, 2012

(87) PCT Pub. No.: WO2011/108951
PCT Pub. Date: Sep. 9, 2011

(65) Prior Publication Data
US 2013/0002147 A1    Jan. 3, 2013

(30) Foreign Application Priority Data
Mar. 4, 2010 (PL) .......................... 390612

(51) Int. Cl.
*H05B 37/02* (2006.01)

(52) U.S. Cl.
CPC ..... *H05B 37/0218* (2013.01); *H05B 37/0227* (2013.01); *Y02B 20/44* (2013.01); *Y02B 20/46* (2013.01)

(58) Field of Classification Search
CPC .................... H05B 37/02; H05B 37/0218; H05B 37/0227; H05B 37/0272
USPC ........................................ 315/131, 119, 130
See application file for complete search history.

(56) References Cited

U.S. PATENT DOCUMENTS

| 7,122,976 | B1 |  | 10/2006 | Null et al. |  |
|---|---|---|---|---|---|
| 8,760,072 | B2 | * | 6/2014 | Josefowicz | ........ H05B 33/0851 315/247 |
| 2006/0267566 | A1 | * | 11/2006 | Williams | ........... H05B 37/0218 323/282 |
| 2008/0079568 | A1 | * | 4/2008 | Primous et al. | .............. 340/541 |

(Continued)

*Primary Examiner* — Thai Pham
*Assistant Examiner* — Borna Alaeddini
(74) *Attorney, Agent, or Firm* — Horst M. Kasper, Esq (57) ABSTRACT

Method of light intensity automatic regulation wherein after the device is connected to the power system parameters of minimum voltage values are set so that the electronic control system remains in standby mode, and the motion and dusk sensors are in standby mode, and those sensors are synchronized with the electronic control system, then to the electronic control system the value of input signal is entered which is generated by the motion sensor at which the operating cycle of the device is started, and also the value of the output signal generated by the dusk sensor whereupon voltage supplied to the light source increases, up to the maximum value, sources of light display 100% illumination intensity, the illumination time after which voltage supplied to the light source decreases to the minimum value as a result of which the source of light does not illuminate and the device goes into standby mode.

2 Claims, 6 Drawing Sheets

(56) References Cited

U.S. PATENT DOCUMENTS

| | | |
|---|---|---|
| 2008/0191630 A1 | 8/2008 | Peng |
| 2010/0026195 A1 | 2/2010 | Potter |
| 2010/0277097 A1* | 11/2010 | Maxik .................. F21S 2/00 315/294 |
| 2012/0001566 A1* | 1/2012 | Josefowicz ........ H05B 33/0851 315/291 |

* cited by examiner

METHOD OF LIGHTING INTENSITY AUTOMATIC ADJUSTMENT AND DEVICE WITH LIGHTING INTENSITY AUTOMATIC ADJUSTMENT

The subject of invention comprises the method of light intensity automatic regulation and a device with light intensity automatic regulation, in particular devices such as high pressure gas-discharge (mercury, sodium, halogen and metal) lamps and low pressure gas-discharge (fluorescent) lamps, energy-efficient lamps and LED lamps and light bulbs designed for illuminating stair halls, corridors, passages in buildings, office rooms, basements, etc., which can bear any shape, for example panels, puddle lights, wall lamps, ceiling lamps and built-in lamps etc.

Popular are lighting solutions for stair halls, corridors, passages, rooms and basements that are based on traditional lamps with carbon-filament or fluorescent bulbs turned on with the use of traditional switches and with clock units automatically switching off the light after the lapse of pre-set time, regardless of whether or not a person or persons need such light. Another defect of that solution is the need to install many switches and to connect them via cabling to the power line supplying the source of light.

Popular are also lighting solutions for stair halls, corridors, passages and basements that are based on traditional lamps with carbon-filament lighting solutions for stair halls, and an external motion sensor and time switch which automatically switch off the light after a pre-set time, regardless of whether or not a person or persons need such light. The advantage of those solutions is the fact that there is no problem in finding the switch in a dark room and the consumption of electricity is much lower—for example almost 9 times—compared to lights without a motion sensor. The disadvantage of those solutions is that because of high temperature relating to traditional bulbs the motion sensor must be installed at a distance of min. 0.5 meters, thus necessitating high costs of installation due to costs of assembly. Another serious weakness of the solution is the need for frequent replacement of bulbs due to their short life cycle because of constant switching on and off. Another disadvantage that increases installation costs is the need to install motion sensors in the area of all entrances and on every floor.

The purpose of the invention is to develop a method of light intensity regulation while ensuring maximum flexibility of the system, effectiveness, energy efficiency and extended life-cycle of the lighting elements.

The purpose of the invention has been achieved by way of developing a method of automatic light intensity regulation owing to which once the device is connected to the mains, parameters of minimum voltage are set so that the electronic control system remains in standby, and the motion and dusk sensors are in standby, and those sensors are synchronized with the electronic control system, also the value of the input signal is set with the electronic control system, generated by the motion sensor at which the operating cycle of the device is started, and also the value of the output signal generated by the dusk sensor whereupon voltage supplied to the light source increases up to the maximum value, and in result the sources of light illuminate with 100% intensity, and the illumination time after which voltage supplied to the light source decreases to the minimum value, in result of which the source of light does not illuminate and the device goes into standby mode, whereas after the parameters are set the device remains in standby until the sensors are in standby, to be automatically activated whenever the motion sensor detects any motion and sends a signal to the system, whereupon the signal generated by the motion sensor is compared with the signal generated by the dusk sensor and the default value, i.e. whether exceeded is the minimum permissible daylight level—if it is darker the system increases voltage in the light source up to the maximum level and the device illuminates with full 100% intensity for the pre-set time upon which the system verifies whether the motion sensor continues to generate a detection signal—if yes, voltage supplied to the light source is maintained on the maximum level and if not—voltage supplied to the light source is reduced to the minimum value and the devices goes into standby and does not illuminate.

Positively, voltage supplied to the light source increases up to the maximum value and the sources of light illuminate with full 100% intensity, or is reduced in leaps.

Positively, voltage supplied to the light source increases up to the maximum value and the sources of light illuminate with full 100% intensity, or is reduced smoothly.

The purpose of the invention has been achieved by way of developing a method whereupon after the device is connected to the power system parameters of minimum voltage are set in the device for the electronic control system and the motion sensor to be in standby, furthermore, the motion sensor is synchronized with the electronic control system, the value of the input signal generated by the motion sensor is entered at which the device starts operating, the voltage increase time during which voltage supplied to the light source increases smoothly within the pre-set time up to the maximum value, the illumination time when the source of light illuminates with full 100% intensity, the time for voltage reduction when voltage supplied to the source of light decreases smoothly within the pre-set time to the minimum value, and the device goes into standby when the source of light illuminates with minimum intensity, and after the parameters are set in the device, the device remains in standby in which the source of light illuminates with a pre-set minimum intensity and the motion sensor remains in standby; however, after the motion sensor detects any motion, the system increases smoothly the voltage for the light source up to the maximum value in result of which the device illuminates with full 100% intensity and for pre-defined time upon which the system checks whether the motion sensor continues to generate the signal and if yes—power supply is maintained at the maximum value and if no—the device goes into standby, voltage is smoothly reduced and the device lights with a pre-set minimum intensity.

Positively, the device is equipped also with a dusk sensor, and additional data are entered into the electronic system regarding the minimum pre-set value of voltage for illumination, which if it falls below that value the device shifts from standby into operating mode and after the motion sensor detects any motions and sends a relevant signal, the intensity of illumination within the ambience is determined, the signal from the dusk sensor is compared with the pre-set value triggering the device and sending signals that switch on and off the powered light sources.

Positively, the device has been equipped additionally with a time countdown system, which is synchronized with the motion sensor and the electronic system, and an additional pre-set value is entered into the electronic system, i.e. the operating time with reduced power, the source of light illuminates with limited intensity, after full intensity operation ceases following a signal from the motion sensor and awaiting the signal from the motion sensor after which in the absence of a signal from the sensor the device goes into standby and if a signal is received—into 100% operating mode.

The purpose of the invention has been achieved way of developing a device with automatic light intensity regulation, which comprises a converter with clamps connected directly to the power supply system, which comprise serially connected a filter of conducted disturbances, a rectifier with a passive reducer of distortions received from the power system, PWM controller of MOSFET power transistor together with MOSFET power transistor and a safety system, an impulse transformer, rectifier with an output filter and a feedback block stabilizing the output current/output voltage with outputs connected to the source of light—LED diodes, through a galvanic separator of the feedback circuit with PWM controller input for MOSFET power transistor with a MOSFET power transistor and a motion sensor controller power unit connected with the motion sensor output and through the regulator of the output current with the feedback block stabilizing the output current/output voltage, with the output of the source of light connected with joined inputs of the feedback block stabilizing the output current/output voltage, a rectifier with an output filter and impulse transformer connected with each other and by way of galvanic separation of the feedback circuit and PWM controller of MOSFET power transistor together with MOSFET power transistor and a safety system, and the motion sensor is designed to detect motion of objects within the range of the passive infra-red sensor and then to send information about the detected object to the output current regulator, and furthermore, the signal from the motion sensor is reinforced and then processed via a controller that controls the switching on of the output current regulator, which causes smooth brightening of the source of light within the pre-set time and if motion ceases—the controller additionally maintains the operation of the output current regulator within strictly programmed time after which the output current regulator is switched off, thus causing the dimming of the light source to the defined intensity level; the controller is powered by a supply unit powered directly from the converter, and the output current regulator is designed to smoothly reduce the current flowing through the light source, whereupon the illumination intensity lessens and the system operates in the limited energy consumption mode, or to increase smoothly the current flowing through the light source up to the maximum value.

The purpose of the invention has been achieved by way of developing a device with automatic light intensity regulation, which comprises a motion sensor powered from the mains, which is designed to detect motion of objects within the range of the detector and thereafter to switch on the load connected to the module, which is the light source supply unit, and the signal generated by the motion sensor is reinforced and then processed by the controller that controls the triggering of the load switching module, whereas the triggering of the module means powering the clamps of the converter consisting of serially connected filter of conducted disturbances, a rectifier with a passive reducer of distortions received from the power system, PWM controller of MOSFET power transistor together with MOSFET power transistor and a safety block, impulse transformer, rectifier with an output filter and a feedback block stabilizing the output current/output voltage; and so, if the controller based on the signals from the sensor detects any motion, the module is triggered as well as the converter durably until the motion is detected, and if the motion ceases the controller keeps up the module in operating mode for strictly preset time, after which the module is switched off, cutting off the power supplied to the converter's circuit, and the module is powered through a supply unit delivering voltage DC according to preset parameters to power the controller and with intensity allowing for proper control of the module, and includes a time countdown unit connected with the controller, which when no motion is detected, sends a signal to the time countdown unit, which starts the countdown, and after the lapse of predefined time the countdown unit sends information about that fact to the output current regulator, which smoothly reduces the current flowing through the light source, whereupon the system operates in the limited energy consumption mode and if during that time the motion sensor detects no motion, the time countdown is reset and the output current regulator increases smoothly the current flowing through the light source up to the maximum value, however if during the limited energy consumption mode the motion sensor detects no motion and the time countdown unit counts off the pre-set time, the time countdown unit shall send a signal to the module, which switches off the current from the converter and the remaining units operate in the standby mode.

Positively, the device comprises a dusk sensor connected directly to the controller input and its task is to detect the intensity of daylight within the range of the dusk sensor if the intensity of light is too low and it is necessary to switch on artificial light, and thereafter to send information about that fact to the controller, wherein the signal is compared with the pre-set value, the module as well as the converter are triggered durably until motion is detected and the light intensity of the ambience is too low, and switches off the module and the converter durably whenever the light intensity of the ambience is too high.

The object of the invention is presented on FIG. 1, which shows a flow chart of the automatic light intensity regulation according to the invention, in a positive example of performance, FIG. 2—a flow chart of the automatic light intensity regulation according to the invention in a positive example of a different performance, FIG. 3—a flow chart of the automatic light intensity regulation according to the invention in a positive example of another performance, FIG. 4—a flow chart of the automatic light intensity regulation in a positive example of performance, FIG. 5—the device with automatic light intensity regulation according to the invention in a positive example of performance—schematically, FIG. 6—the device according to the invention in a second positive example of the performance—schematically, and FIG. 7—the device according to the invention in a third positive example of performance—schematically.

Figure 1:
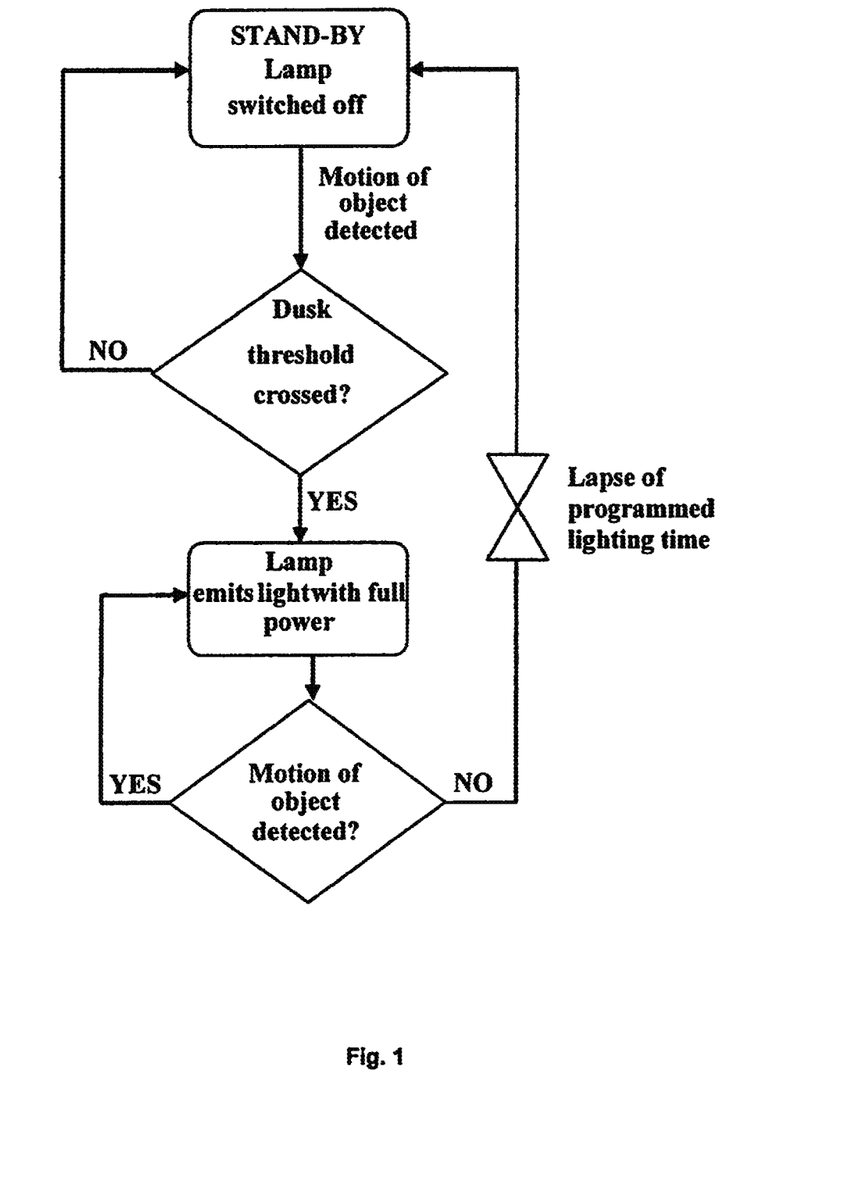

FIG. 1 presents a flow chart of the method of automatic light intensity regulation according to the invention in the simplest example of its performance, in which the device with automatic light intensity regulation includes an electronic control system, source of light, motion sensor and a dusk sensor. In this method after the device is connected to the mains, parameters of minimum value of current are set for the system, in which the electronic control system remains in standby and the motion sensor and the dusk sensor are in standby, the sensors are synchronized with the electronic control system, and the value of the output signal generated by the motion sensor is set with the electronic control system, at which the device is started, also the value of the output signal generated by the dusk sensor at which the current supplied to the light source increases in leaps up to the maximum value to have the light sources illuminated with full, 100% intensity, the illumination time upon the lapse of which the current supplied to the light source is reduced in leaps to the minimum value, in result of which the source of light does not illuminate and the device goes into standby mode.

After all values are set, the device operates in an automatic operating cycle, i.e. in standby when the source of light does not illuminate and the sensors are in standby; then, if the motion sensor detects any motion the signal generated by the dusk sensor is compared in the system, i.e. whether the minimum permissible level of daylight has been surpassed and if it is darker—the system increases the current supplying the light source up to the maximum value in result of which the device illuminates with full 100% intensity for a pre-set time after the lapse of which the system checks whether the motion sensor continues to generate a signal—if yes, the power supply is maintained on the maximum level and if not—the current is reduced to the minimum level and the devices goes into standby and does not illuminate.

The device characterizes with minimum energy consumption in the standby mode (only the motion sensor and the dusk sensor are powered).

Figure 2:
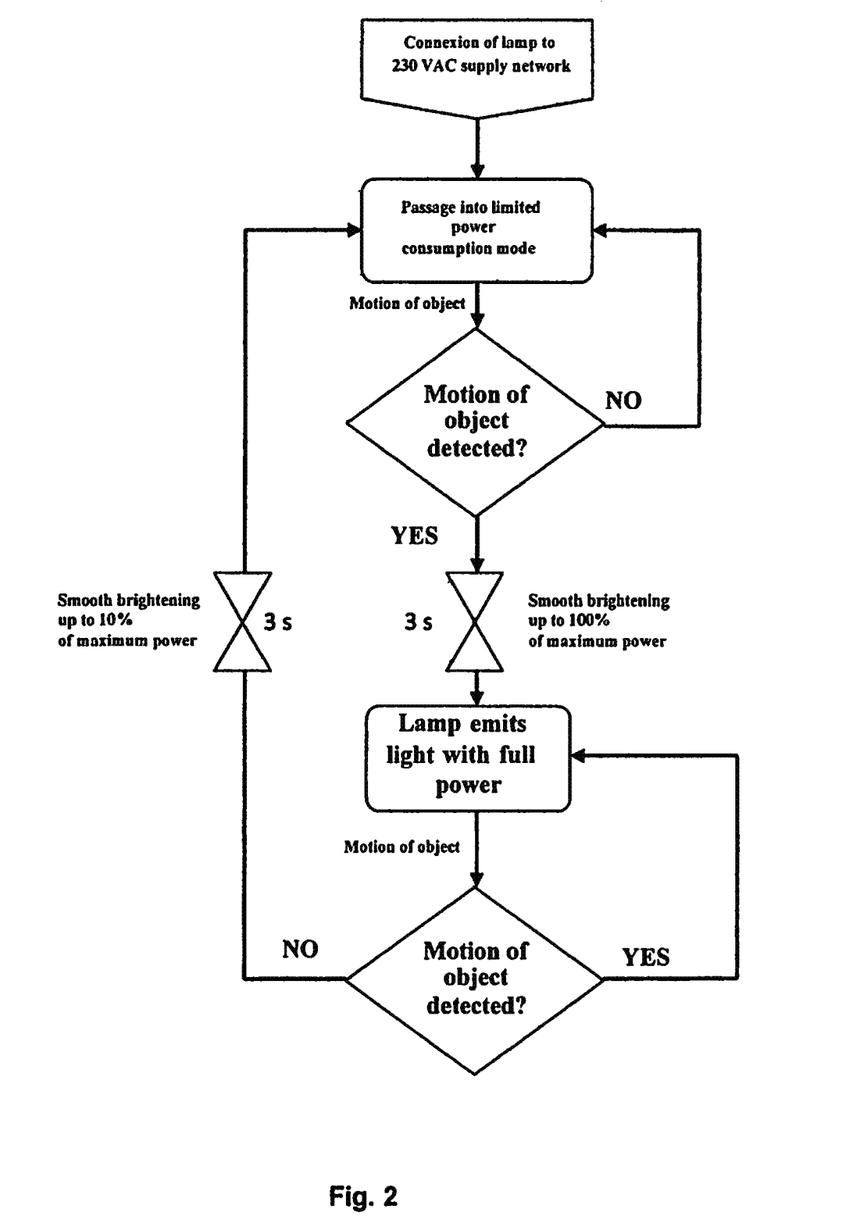

FIG. 2 presents a flow chart of the method of automatic light intensity regulation according to the invention in another example of its performance, applied in a device with automatic light intensity regulation, which comprises an electronic control unit, light source and a motion sensor. In this method after the device is connected to the mains, parameters of minimum voltage values are set so that the electronic control system and the motion sensor are in standby, and the motion sensor is synchronized with the electronic control system; the value of output signal is set with the electronic control system, which is generated by the motion sensor at which the operating cycle of the device is started, the time of voltage increase during which voltage supplied to the source of light is increased smoothly within pre-set time, e.g. 3 s, up to the maximum value, the illumination time after which voltage supplied to the light source decreases smoothly to the minimum value within the pre-set time, e.g. 3 s to the minimum value, for example 10% of light intensity, and the device goes into standby, whereas the source of light illuminates with e.g. 10% intensity.

After all parameters are set, the device is operating in the automatic mode. i.e. goes into standby when the source of light illuminates with a the preset minimum intensity, e.g. 10% and the motion sensor is in standby; thereafter whenever the motion sensor detects any movement the system smoothly increases the voltage of the light source up to the maximum value—the device illuminates with full 100% intensity and maintains it during the pre-set time after the lapse of which the system verifies whether the motion sensor continues to generate a detection signal—if yes—power supply is maintained at the maximum value, and if not—the device goes into standby and voltage is smoothly decreased and as a result the device illuminates with pre-set minimum intensity.

Figure 3:
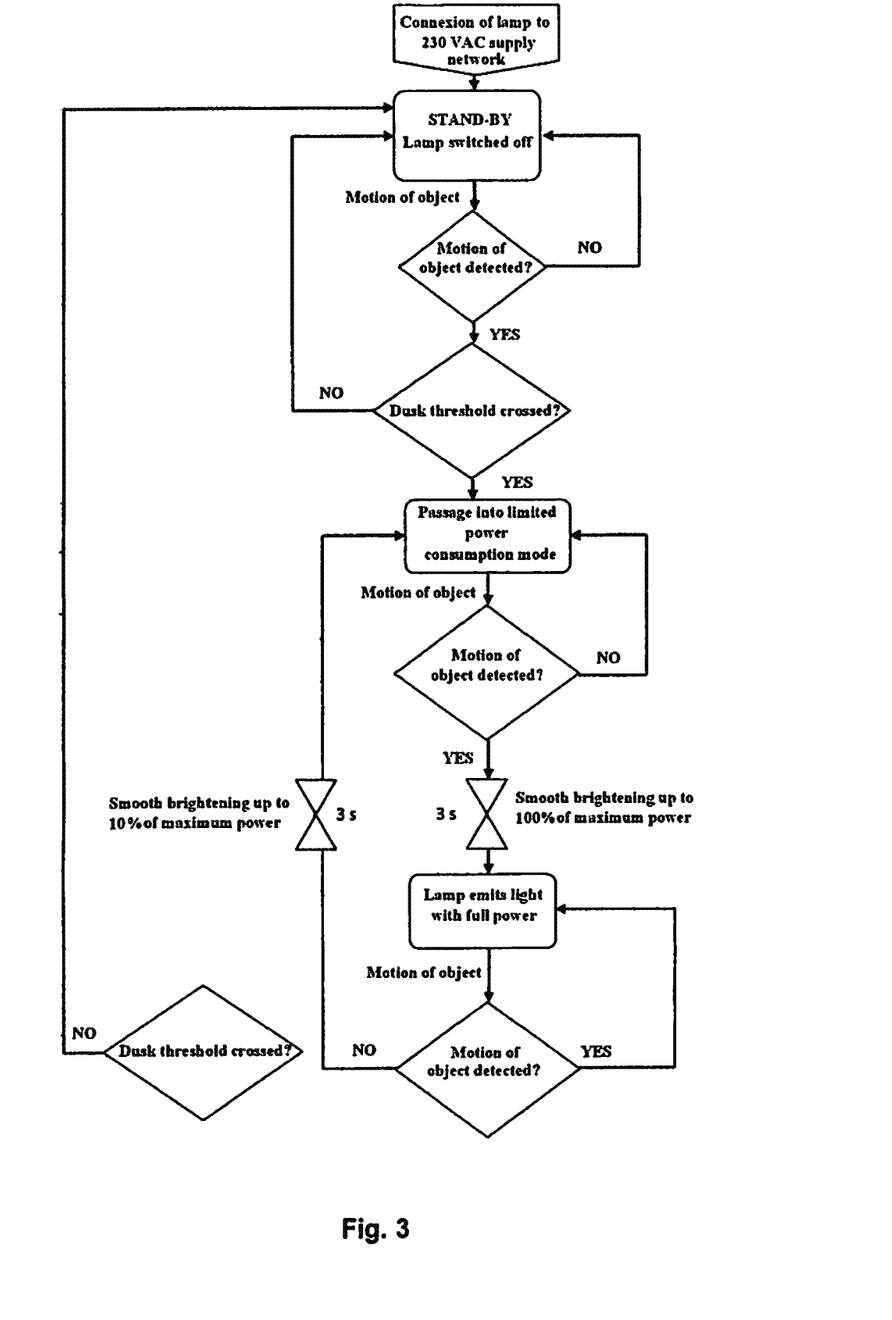

FIG. 3 presents a flow chart of the method of automatic light intensity regulation according to the invention in another example of its performance, differing from the example shown in flow chart in FIG. 2 in such way that the device has been equipped additionally with a dusk sensor. Because of the dusk sensor, whenever the dusk threshold is not exceeded, the device remains in standby—the source of light does not illuminate. Once the dusk threshold is surpassed, the device remains in standby, shifting to the limited energy consumption mode at the pre-set level, e.g. 10% of the maximum intensity, which causes that the source of light illuminates with limited pre-set intensity, e.g. 10%. If within the range of the motion sensor any motion is detected, the device operates as before, i.e. within the pre-set time—e.g. 3 s voltage is smoothly increased up to full intensity, the source of light smoothly brightens and illuminates with full intensity until no motion is detected. Then the source of light smoothly diminishes to the pre-set level of 10% of consumed energy. The source of light in the device shall cease to illuminate when the "illumination threshold" is exceeded (similarly as with the triggering of the light source).

Figure 4:
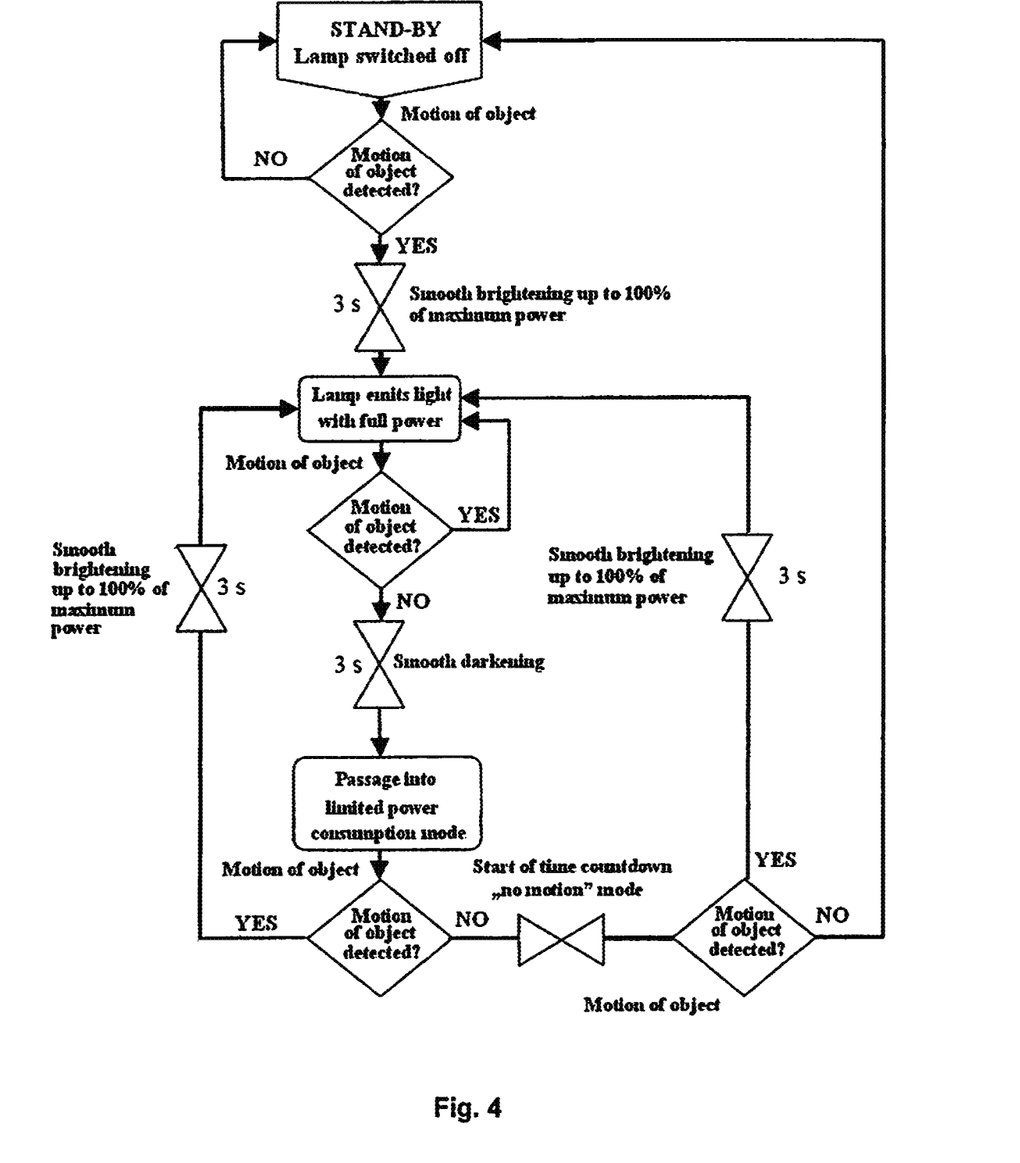

FIG. 4 presents a chart flow for automatic light intensity regulation according to the invention in another example of its performance, which allows for extending the illumination time while maintaining minimum power consumption. The device does not include a dusk sensor; hence it operates on a 24 h basis. In order to achieve the assumed functional effects the device is equipped in a time countdown unit to define time after the lapse of which the device shifts to relevant working modes: full—100% illumination intensity or limited—e.g. 10% illumination intensity. The device is equipped with a motion sensor, which triggers the device whenever motion is detected within the range of the sensor in such a way that it operates in full 100% illumination intensity mode. After the lapse of the pre-set time the device automatically and smoothly shifts to the limited intensity mode at the level of approx. 10%, and then the device starts the time countdown.

When during the time countdown (while the device is working in limited light intensity mode) no motion is detected, after the lapse of e.g. 15 minutes the device shall switch off and shift to standby. Another detection within the range of the motion sensor shall trigger the light up to 100% intensity and the devices works in full intensity mode; thereafter if the sensor detects no motion the device shall return to the limited energy consumption mode after the pre-set time, e.g. 10%, in which case the source of light illuminates with 10% intensity and after another—for example—15 minutes without any motion, the source of light is diminished and the device goes into standby. If when the device shifts into limited operating mode any motion is detected, the device shall automatically and smoothly return to full operating mode with 100% light intensity.

Figure 5:
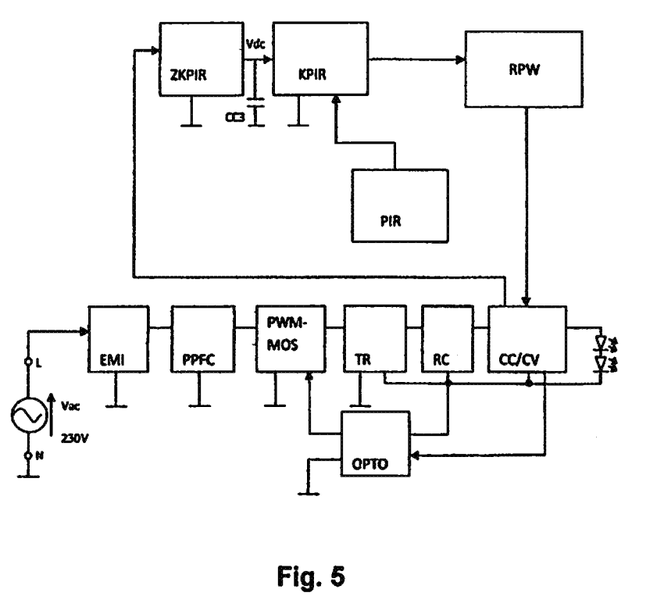

FIG. 5 presents the basic device with automatic light intensity regulation in a positive example of its performance.

The device with automatic light intensity regulation according to the invention includes a converter with clamps connected automatically to the power supply network, and the converter comprises serially connected filter of conducted disturbances EMI, a rectifier with a passive reducer of distortions of the current received from the power system PPFC, PWM controller of MOSFET power transistor together with MOSFET power transistor and a safety system PWM-MOS, impulse transformer TR, rectifier with an output filter RC and a feedback block stabilizing the output current/output voltage CC/CV with outputs connected with the source of light—LED diodes, through a galvanic separator of the feedback circuit OPTO with PWM controller input for MOSFET power transistor with a MOSFET power transistor and a safety unit PWM-MOS and a supply unit ZKPIR of the KPIR controller of PIR sensor connected with the output of the passive infra-red sensor PIR and through the output current regulator RPW with the feedback block stabilizing the output current/output voltage CC/CV. Output of the source of light is connected with joined inputs of the feedback block stabilizing the output current/output voltage CC/CV, a rectifier with an output filter RC and impulse transformer TR connected with each other by way of galvanic separation of the feedback circuit OPTO and PWM controller of MOSFET power transistor together with MOSFET PWM-MOS power transistor.

The task of the passive infra-red sensor PIR is to detect the motion of objects within the range of the passive infra-red sensor PIR and then to send information about the detection to the output current regulator RPW. Motion is detected by way of sensing changes in the infra-red radiation of objects moving within the range of the passive infra-red sensor PIR compared to the background radiation.

The signal from the passive infra-red sensor PIR is reinforced and then processed by the controller module KPIR. The controller module KPIR controls the triggering of the output current regulator, whereupon the light of the lamp is illuminated smoothly within a pre-set time. If the motion ceases, the controller KPIR additionally maintains the operation of the RPW module in a strictly set time after which the module RPW is switched off, causing the lamp to dim to a particular intensity.

The module KPIR is powered by ZKPIR supply unit, which in this lamp model is supplied directly from the converter powering LED modules. The task of the regulator RPW is to smoothly limit the current flowing through LED diodes whereupon the lamp's intensity falls—for example—down to 10% of the maximum value and the lamp operates in the limited power consumption mode. While in this mode the PIR sensor detects any motion, RPW system shall increase smoothly the current flowing through LED diodes up to the maximum level as a result of which the lamp shall be working in the full intensity mode.

Figure 6:
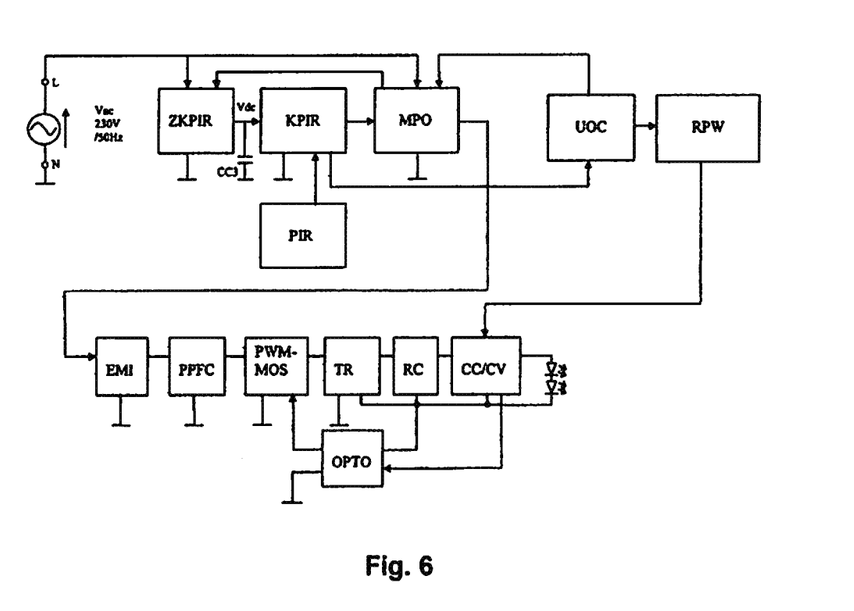

FIG. 6 presents the light intensity regulation unit in another positive example of its performance.

The PIR motion sensor is powered with sinusoidal variable current 230 V/50 Hz. The task of the detector PIR is to detect motion within the range of the PIR detector and then to switch on the load connected to MPO module (electromagnetic relay of direct current), which comprises the light source supply unit, e.g. LED diodes. Motion is detected through change of infra-red radiation of objects moving from the range of the PIR motion sensor as compared to the background's radiation.

The signal from PIR motion sensor is reinforced and then processed by the controller module KPIR. The KPIR controller module controls the switching on of the load switching module MPO. The MPO module is switched on by way of supplying power to the clamps of the converter, which comprises serially connected filter of conducted disturbances EMI, a rectifier with a passive reducer of distortions of the current received from the power system PPFC, PWM controller of MOSFET power transistor together with MOSFET power transistor and a safety system PWM-MOS, impulse transformer TR, rectifier with an output filter RC and a feedback block stabilizing the output current/output voltage CC/CV with outputs connected with the source of light—LED diodes, through a galvanic separator of the feedback circuit OPTO with PWM controller input for MOSFET power transistor with a MOSFET power transistor and a safety unit PWM-MOS, with voltage of 230V/50 Hz.

If the controller KPIR based on signals from the sensor PIR detects motion, it switches on the module MPO and thus the module of the converter durably, until motion is detected. If motion ceases, the controller KPIR additionally maintains the module MPO switched on for strictly programmed time and then the module MPO is switched off by cutting off the supply to the converter circuit. The module KPIR is powered by the power supply unit ZKPIR supplying voltage DC according to pre-set parameters to power the controller KPIR and with power allowing for proper control of the module MPO.

The power supply unit ZKPIR is used in such manner that its energy efficiency both in standby (no motion within the range of the motion sensor PIR, module MPO switched off) and in the switched-on mode (module MPO switched on) is high. The efficiency of the supply unit ZKPIR is shifted between operating modes—in the standby it characterizes with reduced power consumption as only the circuit of the controller KPIR uses power and in the switched-on mode with load allowing for the supply of power to the module MPO (the transmitter's coil) to trigger the converter. The shifts of the supply unit ZKPIR between the standby and the switched-on mode with load are effected by way of closing/opening an additional pair of contacts in the module MPO.

In addition, the lamp is equipped with an automation system owing to which whenever no motion is detected by the motion sensor PIR, the controller KPIR sends a signal to the time countdown unit UOC, which starts the countdown. After pre-set time, the countdown unit UOC sends information about that fact to the output current regulator RPW. The output current regulator RPW is designed to reduce smoothly the current that flows through the light source, e.g. a LED diode, in result of which the intensity of the lamp falls to 10% of the maximum value and the lamp operates in the reduced energy consumption mode. Whenever in the reduced energy consumption mode the motion sensor PIR detects any movement, the countdown is reset and the system RPW increases smoothly the current flowing through the light source up to the maximum value—the lamps then operates with full intensity. When during the limited energy consumption mode the motion sensor PIR detects no motion and the countdown unit UOC counts off the operating time set by the user, the countdown unit UOC shall send a signal to the module MPO, which switches off the converter and the lamps start to operate in the standby mode.

Figure 7:
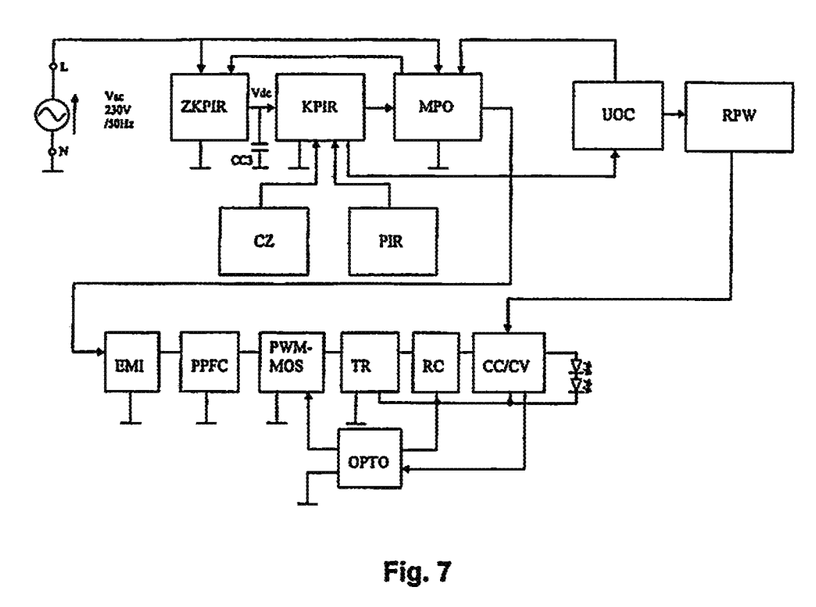

FIG. 7 presents the light intensity automatic regulation system in another, positive example of its performance, which differs from the light intensity regulation system described in FIG. 6 in such way that it is equipped additionally with a dusk sensor CZ connected directly to the output of the controller KPIR of the passive infra-red sensor PIR; the dusk sensor is designed to block the switching of the lamp when daylight intensity is sufficient enough for artificial light to be unnecessary, i.e. the lamp shall illuminate after dusk only. The signal from the dusk sensor CZ regarding light intensity is each time processed by the controller KPIR and if it is not necessary to switch on artificial light despite the signal from the motion sensor, the controller PIR shall not trigger the module MPO and the output current regulator RPW shall not be switched on. The system operates in the standby mode until the conditions of the external lighting change.

The presented construction solutions serve as examples only and do not exhaust the essence of the invention.

The invention claimed is:

1. A device with light intensity automatic regulation, wherein the device is equipped with a motion sensor (PIR), powered with a power line voltage, designed to detect motion of objects within its range, and then to switch on a load connected to a module (MPO), which constitutes a supply unit of the light source, wherein a signal generated from the motion sensor (PIR) is reinforced and processed by a controller (KPIR), which controls the switching on of a load switch-on module (MPO), wherein the (MPO) module is switched by supplying power to the clamps of a converter comprising:

serially connected filter of conducted constant disturbances (EMI), a rectifier with a passive reducer of distortions of the current received from the power system (PPFC), a PWM controller of a MOSFET power transistor together with the MOSFET power transistor and a safety system (PWM-MOS), an impulse transformer (TR), a rectifier with an output filter (RC) and a feedback block stabilizing the output current/output voltage CC/CV, Wherein:

when the controller (KPIR) based on the signals from the sensor (PIR) detects motion, it triggers the module (MPO) and the converter durably as long as the motion is being detected, wherein when motion ceases, the controller (KPIR) additionally supports operation of the module (MPO) during strictly programmed time, wherein when the module (MPO) is switched off, cutting off the power from the converter's circuit, the module (KPIR) is powered by the supply unit (ZKPIR) supplying a DC voltage with pre-set parameters to the controller (KPIR), with output allowing for proper control of the module (MPO), wherein the device comprises a time countdown unit (UPC) connected with the controller (KPIR), that whenever motion is no longer detected by the motion sensor (PIR) sends a signal to a time countdown unit (UOC), to start a countdown, wherein after the lapse of pre-set time, the countdown unit (UOC) sends information about lack of motion to the output current regulator (RPW), which smoothly reduces a current flowing through the light source, due to which the system operates in a limited power consumption mode, wherein when during the limited power consumption mode the motion sensor (PIR) detects motion, the countdown is reset and an output current regulator (RPW) increases smoothly the current flowing through the light source up to the maximum value, wherein when during the limited power consumption mode the motion sensor (PIR) detects no motion, and the countdown unit (UOC) counts off the pre-set time, the countdown unit (UOC) sends a signal to the module (MPO), which cuts off voltage from the converter and the remaining units go into standby mode.

2. The device according to claim 1, wherein the device is equipped with a dusk sensor (CZ) connected directly to the input of the controller (KPIR), wherein the dusk sensor (CZ) is design to detect first intensity of daylight in the ambience within its range, when intensity of daylight is insufficient and it is necessary to switch on artificial light, and then to send information about intensity of daylight to the controller (KPIR) processing a signal by comparing its value with the pre-set value, wherein the controller (KPIR) triggers the module (MPO) and the converter durably until the motion is detected, and the intensity of daylight in the ambience is insufficient, wherein the controller (KPIR) switches of the module (MPO) and the converter durably as long as the intensity of daylight in ambience is too high.

* * * * *